United States Patent [19]

Eller et al.

[11] Patent Number: 5,770,174

[45] Date of Patent: Jun. 23, 1998

[54] METHOD FOR CONTROLLING REACTION TEMPERATURE

[75] Inventors: James M. Eller; Roy N. McBrayer, both of Austin; Jimmy G. Swan, Alvin, all of Tex.

[73] Assignee: RPC Waste Management Services, Inc., Austin, Tex.

[21] Appl. No.: 254,956

[22] Filed: Jun. 7, 1994

Related U.S. Application Data

[63] Continuation of Ser. No. 868,954, Apr. 16, 1992, abandoned.

[51] Int. Cl.$^6$ ............................ C07B 31/00; C07B 33/00
[52] U.S. Cl. ......................... 423/659; 210/742; 210/752; 210/199
[58] Field of Search ............................... 423/654, DIG. 6, 423/659; 208/48 Q; 210/742, 752, 766, 199, 85, 139

[56] References Cited

U.S. PATENT DOCUMENTS

| 1,988,456 | 1/1935 | Lysholm | 60/39.05 |
| 2,647,368 | 8/1953 | Tribbnigg et al. | 60/39.05 |
| 2,697,910 | 12/1954 | Brzozowski | 60/39.55 |

(List continued on next page.)

FOREIGN PATENT DOCUMENTS

| 4-745 | 10/1979 | European Pat. Off. | 423/533 |
| 53-091093 | 8/1978 | Japan . | |
| PCTUS92/06459 | 12/1992 | WIPO . | |

OTHER PUBLICATIONS

Chowdhury et al., "Catalytic Wet Oxidation of Strong Waste Waters", AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation —Deep Well Technology for Toxic Wastewaters and Sludges," Technical Report, The University of Texas at Austin, 1989.

Imamura et al., "Wet Oxidation of Acetic Acid Catalyzed by Co–Bi Complex Oxides," *Ind. Eng. Chem. Prod. Res. Dev.*, 21(4), pp. 570–575 (1982).

Lee et al., "Efficiency of Hydrogen Peroxide and Oxygen in Supercritical Water Oxidation of 2,4–Dichlorophenol and Acetic Acid," *The Journal of Supercritical Fluids*, 3 pp. 249–255 (1990).

Lu et al., "Selective Particle Deposition in Crossflow Filtration," *Sep. Sci. and Technol.*, 24(7&8), 517–540 (1989).

Mahlman et al., "Cross–Flow Filtration in Physical Chemical Treatment of Municipal Sewage Effluents," Oak Ridge Natl. Lab. Technical Report, EPA/600/2–76/025, Feb. 1976.

Modell et al., "Supercritical Water—Testing Reveals New Process Holds Promise," *Solid Wastes Management*, Aug. 1982.

Murkes, "Low–shear and High shear Cross–flow Filtration," *Filtration and Separation*, 23(6), 364–365 (1986).

Murkes et al., *Crossflow Filtration: Theory and Practice*, John Wiley & Sons: New York, 1988.

Opatken, "Aqueous–Phas Oxidation of Sludge Using the Vertical Reaction Vessel System," EPA/600/2–87/022, Mar. 1987.

(List continued on next page.)

*Primary Examiner*—David A. Simmons
*Assistant Examiner*—Linda L. Gray
*Attorney, Agent, or Firm*—Conley, Rose & Tayon, P.C.

[57] ABSTRACT

Oxidation reactions occurring in a plug flow reactor under conditions approximating supercritical water conditions are controlled by injecting a process stream of water and two reactants in non-stoichiometric proportions into the reactor and causing the process stream to flow through the reactor. Water is injected at one or more points downstream from the inlet to lower the temperature of the process stream and additional reactant injected to re-start the reaction. The quench and re-start process is repeated until substantially all oxidizable material in the process stream has be oxidized.

103 Claims, 1 Drawing Sheet

U.S. PATENT DOCUMENTS

| | | | |
|---|---|---|---|
| 2,767,233 | 10/1956 | Mullen, II et al. | 208/48 Q |
| 2,944,396 | 7/1960 | Barton et al. | 60/39.05 |
| 3,101,592 | 8/1963 | Robertson et al. | 603/39.05 |
| 3,449,247 | 6/1969 | Bauer | 210/63 |
| 3,464,885 | 9/1969 | Land et al. | 162/17 |
| 3,549,314 | 12/1970 | Shah | 23/49 |
| 3,606,999 | 9/1971 | Lawless | 23/1 |
| 3,654,070 | 4/1972 | Pradt et al. | 162/30 |
| 3,849,536 | 11/1974 | Morgan | 423/DIG. 3 |
| 3,853,759 | 12/1974 | Titmas | 210/63 |
| 3,899,923 | 8/1975 | Teller | 60/39.05 |
| 3,900,300 | 8/1975 | Lehman | 55/184 |
| 3,912,626 | 10/1975 | Ely et al. | 210/50 |
| 3,938,972 | 2/1976 | Sugimura | 55/440 |
| 3,978,661 | 9/1976 | Cheng | 60/39.55 |
| 4,017,421 | 4/1977 | Othmer | 423/659 |
| 4,141,829 | 2/1979 | Thiel et al. | 210/63 |
| 4,215,094 | 7/1980 | Inao et al. | 423/123 |
| 4,217,218 | 8/1980 | Bauer | 210/63 |
| 4,221,577 | 9/1980 | Lowrie | 55/392 |
| 4,229,296 | 10/1980 | Wheaton et al. | 210/758 |
| 4,272,383 | 6/1981 | McGrew | 210/741 |
| 4,292,953 | 10/1981 | Dickinson | 126/263 |
| 4,326,957 | 4/1982 | Rosenberg | 210/436 |
| 4,338,199 | 7/1982 | Modell | 210/721 |
| 4,370,223 | 1/1983 | Bose | 208/125 |
| 4,377,066 | 3/1983 | Dickinson | 60/39.05 |
| 4,378,976 | 4/1983 | Rush | 95/29 |
| 4,380,960 | 4/1983 | Dickinson | 110/347 |
| 4,384,897 | 5/1983 | Brink | 127/37 |
| 4,384,959 | 5/1983 | Bauer et al. | 162/31 |
| 4,460,628 | 7/1984 | Wheaton et al. | 427/214 |
| 4,488,866 | 12/1984 | Schirmer et al. | 431/2 |
| 4,543,190 | 9/1985 | Modell | 210/721 |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,668,256 | 5/1987 | Billiet et al. | 55/219 |
| 4,698,157 | 10/1987 | Gillot | 210/496 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,744,909 | 5/1988 | Ferraro et al. | 210/752 |
| 4,774,006 | 9/1988 | Kaufmann | 210/742 |
| 4,792,408 | 12/1988 | Titmas | 210/747 |
| 4,793,153 | 12/1988 | Hembree et al. | 62/476 |
| 4,822,394 | 4/1989 | Zeigler et al. | 62/17 |
| 4,822,497 | 4/1989 | Hong et al. | 210/761 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,878,543 | 11/1989 | Chornet et al. | 210/759 |
| 4,880,440 | 11/1989 | Perrin | 55/16 |
| 4,891,139 | 1/1990 | Zeigler et al. | 210/747 |
| 4,898,107 | 2/1990 | Dickinson | 110/346 |
| 4,936,990 | 6/1990 | Brunsell et al. | 210/331 |
| 4,963,329 | 10/1990 | Burgess et al. | 422/168 |
| 4,968,328 | 11/1990 | Duke | 55/1 |
| 4,983,296 | 1/1991 | McMahon et al. | 210/603 |
| 5,009,857 | 4/1991 | Hearle | 422/180 |
| 5,011,614 | 4/1991 | Gresser et al. | 210/761 |
| 5,053,142 | 10/1991 | Sorenson et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,133,877 | 7/1992 | Rofer et al. | 210/761 |
| 5,167,930 | 12/1992 | Fassbender | 422/112 |
| 5,183,577 | 2/1993 | Lehman | 210/761 |
| 5,192,453 | 3/1993 | Keckler et al. | 210/761 |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |
| 5,280,701 | 1/1994 | Tolman | 60/39.02 |
| 5,339,621 | 8/1994 | Tolman | 60/39.02 |
| 5,384,051 | 1/1995 | McGinness | 210/7.61 |
| 5,385,214 | 1/1995 | Spurgeon | 180/304 |
| 5,387,398 | 2/1995 | Mueggenburg et al. | 422/168 |
| 5,421,998 | 6/1995 | Li et al. | 210/136 |

OTHER PUBLICATIONS

Perona et al., "A Pilot Plant for Sewage Treatment by Cross–Flow Filtration," Oak Ridge Natl. Lab. Technical Report ORNL–TM–4659, Oct. 1974.

Shapira et al., "Removal of Heavy Metals and Suspended Solids from Battery Wastewaters: Application of Hydroperm Cross–flow Microfiltration," Gen. Battery Corp. Report EPA/600/2–81–147, Aug. 1981.

Thomason et al., "Supercritical Water Destruction of Aqueous Wastes," *Hazardous Waste*, 1(4), 453–467 (1984).

Teletzke, "Wet Air Oxidation," *Chem. Eng. Prog.*, 60(1), pp.33–38, Jan. 1964.

Yang et al., "Homogeneous Catalysis in the Oxidation of p–Chlorophenol in Supercritical Water," *Ind. Eng. Chem. Res.*, 27(1), pp. 2009–2014 (1988).

Zimmermann, "New Waste Disposal Process," *Chem. Eng.*, pp. 117–120, Aug., 1985.

Zimmerman et al., "The Zimmerman Process and its Applications in the Pulp and Paper Industry," TAPPI, 43(8), pp. 710–715 (1960).

Keng–Chen Chang et al., "Supercritical water oxidation of acetic acid by potassium permanganate," *J. of Hazardous Materials*, vol. 32, pp. 001–012 (no date available).

Jacobs et al., "Phase Segregration," *Handbook of Separation Process Technology*, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep. 1989.

Todheide et al., "Das Zweiphasengebiet und die kritische Kurve im System Kohlendioxid –Wasser bis zu Druken von 3500 bar," *Zeitschrift fur Physikalischo Chemie Neue Folge*, Bd. 37, 8. 387–401 (1963).

Zimmermann et al., "The Zimmerman Process and Its Applications in the Pulp and Paper Industry," TAPPI, 43 (8), pp. 710–715 (1960).

Yoshiaki Harada, "Wet Catalytic Oxidation Process for Wastewater Treatment," *Abstract* (1991).

Sellchiro Imamura et al., "Wet Oxidation of Ammonia Catalyzed by Cerium–Based Composite Oxides," *Ind. Eng. Chem. Prod. Res. Dev.*, vol. 24, No. 1, pp. 75–80 (1985).

Lei Jin et al, "The Effect of Supercritical Water on the Catalytic Oxidation of 1–4–Dichlorobenzene," presented by AIChE Spring Meeting, Orlando, FL, Mar. 19–23 (1990), *Abstract*.

Dong–Soo Lee et al., "Efficiency of $H_2O_2$ in Supercritical Water Oxidation of 2, 4–Dichlorophenol and Acetic Acid," presented at AIChE Spring Meeting, Orlando, FL, Mar. 18–22 (1990).

Teletzke et al., "Components of Sludge and Its Wet Air Oxidation Products," *Journal WPCF*, 39 (6):994–1005, 1967.

Conditt and Sievers, "Microanalysis of Reaction products in Sealed Tube Wet Air Oxidations by Capillary Gas Chromatography," *Anal. Chem.*, 56:2620–2622, 1984.

McGinnis et al., "Conversion of Biomass into Chemicals with High–Temperature Wet Oxidation," *Ind. Eng. Chem. Prod. Res, Dev.*, 22(4):633–636, 1984.

Baker, et al, "Membrane Separation Systems –A Research & Development Needs Assessment," *Department of Energy Membrane Separation Systems Research Needs Assessment Group, Final Report, II*, Mar., 1990.

Urusova, Phase Equilibria in the Sodium Hydroxide–Water and Sodium Chloride–Water Systems at 350–550 deg., *Russian Journal of Inorganic Chemistry*, 19(3):450–454, 1974.

Valyashko, "Phase Equilibria in Water–Salt Systems: Some Problems of Solubility at Elevated Temperature and Pressure," *High Temperature High Pressure Electrochemistry in Aqueous Solutions*. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," *Society of Automotive Engineers, Inc.*, pp. 189–203, 1990.

Dell–Orco et al., "The Solubility of 1:1 Nitrate Electrolytes in Supercritical Water," *Los Alamos National Lab Report*, LA–UR–92–3359, pp. 1–17, 1992.

Martynova, "Solubility of Inorganic Compounds in Subcritical and Supercritical Water," *High Temperature High Pressure Electrochemistry in Aqueous Solutions*. National Association of Corrosion Engineers, 4:131–138, 1976.

Armellini and Tester, "Solubilities of Sodium Chloride and Sodium Sulfate in Sub–and Supercritical Water Vapor," AIChE National Meeting, Los Angeles, California, Nov. 17–22, 1991, pp. 1–15.

Excerpts From Publication Showing Salt Mixture Properties (pp. 124,780,781,814,816) (No Date Available).

A.G. Fassbender, Supercritical Water Oxidation Workshop, "The Dual Shell Pressure Balanced Vessel: A Reactor For Corrosive Applications," (11 pages). (No Date Available).

Excerpts From Publication "Strategies for Sticky Salts," (2 pages). (No Date Available).

Eco Waste Technologies, "Fact Sheet" and photograph of SCWO Pilot Plant, Aug. 1994 (2 pages).

Eco Waste Technologies, "Environmental Breakthrough: Huntsman Announces Successful Use of New Technology," (2 pages). (No Date Available).

Austin American–Statesman, Kirk Ladendorf, article entitled "Company Hopes Treatment Cuts Waste," (1 page). Aug. 25, 1994.

Eco Waste Technologies, Circular on Supercritical Water Oxidation (5 pages) (No Date Available).

Jimmy Griffith, "Destruction of Aqueous Organic Wastes by Supercritical Water Oxidation," Jun. 15–17, 1994, (12 pages).

Dr. Earnest F. Gloyna, P.E., "Supercritical Water Oxidation Applications For Industrial Sludges," Jan. 30, 1992, (pp. 1–15).

Earnest F. Gloyna and Lixiong Li, "Supercritical Water Oxidation: An Engineering Update," Feb. 1992, (pp. 1–25).

Separations Research Program Center for Energy Studies, The University of Texas at Austin, "Separations Update," Spring 1994 issue, (pp. 1–4).

E.F. Gloyna, L. Li and R.N. McBrayer, "Engineering Aspects of Supercritical Water Oxidation," Wat. Sci. Tech., vol. 30, No. 9, 1994, (pp. 1–10).

Keenan et al. "General College Chemistry" Fifth Ed. pp. 179–180 (No Date Available).

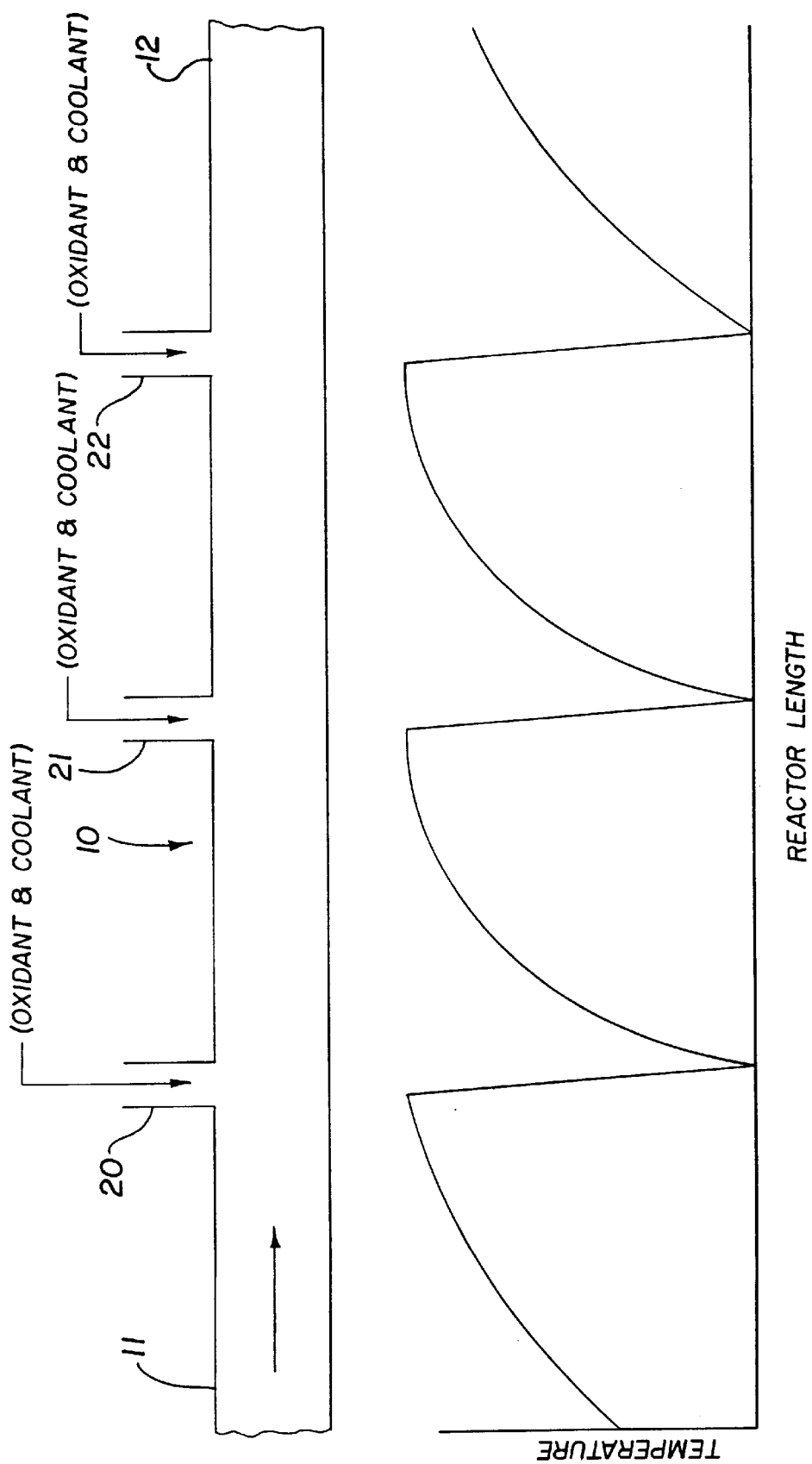

METHOD FOR CONTROLLING REACTION TEMPERATURE

This is a continuation of application Ser. No. 07/868,954 entitled Method for Controlling Reaction Temperature filed Apr. 16, 1992, now abandoned.

This invention relates to controlling reactions which occur at conditions approximating supercritical water conditions. More particularly, it relates to controlling reactions in a plug flow reactor operating near supercritical water conditions by injecting a reactant and/or coolant into a reaction stream containing an excess of another reactant at pre-determined intervals to limit maximum reaction temperature and thereby control reaction rates.

BACKGROUND OF THE INVENTION

Control of reaction temperature is essential to maintaining control of many reaction processes and, therefore, the end results produced by such processes. In some instances, exothermic reactions proceed so rapidly that, unless controlled, they generate temperatures which endanger the integrity of the reaction vessel itself. Many reactions produce reaction by-products which, if the temperature is not properly controlled, may proceed to further undesired secondary reactions. In reactions which occur under pressure and temperature conditions sufficient to achieve supercritical water conditions, salt precipitation and/or other competing side reactions may occur unless the maximum temperature of reaction is limited.

Reaction temperatures of exothermic reactions are generally controlled by limiting the rate of reaction. For example, over-all reaction rate can be limited by gradual mixing of reactants so that the one reactant and/or the reaction vessel absorbs energy from the reaction and transfers that energy to an external sink by cooling the reaction vessel or the like. Such processes, however, are difficult to control and cannot be readily or economically applied to many reaction conditions.

SUMMARY OF THE INVENTION

In accordance with the present invention, oxidation reactions in a reactor operating at or near supercritical water conditions are controlled by simultaneous and/or sequential injection of water and one of the reactants (at timed and/or spaced intervals) into a flowing process stream comprised of water at near supercritical conditions and non-stoichiometric amounts of an oxidant and the material to be oxidized. The reactant injected may be either oxidant or material to be oxidized, depending on the stoichiometric imbalance of the process stream. By injecting water, the reaction temperature is rapidly reduced. However, simultaneous injection of reactant re-starts the reaction so that temperature again increases and the reaction process becomes a series of reaction stages which are controlled to prevent the reaction temperature from exceeding a pre-determined maximum temperature. The reaction is repeatedly quenched and re-started until the desired oxidation or other reaction completion has been achieved. By sequentially quenching the system and injecting reactant to re-start the reaction, the temperature of the reaction can be controlled between pre-determined upper and lower limits as desired. Furthermore, by injecting reactants which raise the temperature above that achievable by oxidation of the oxidizable material initially contained in the process stream, materials can be oxidized which, if oxidized alone, would not produce sufficient energy to maintain a self-sustaining reaction.

Other features and advantages of the invention will become more readily understood from the following detailed description taken in connection with the appended claims and attached drawing in which:

BRIEF DESCRIPTION OF THE DRAWINGS

The sole FIGURE is a schematic representation of a plug flow tube reactor superimposed on a idealized graph of temperature versus tube location in a reactor employing the process of the invention.

DESCRIPTION OF THE PREFERRED EMBODIMENTS

A typical reactor adapted to utilize the principles of the invention is schematically illustrated in the drawing. The reactor comprises an elongated reaction chamber or tube 10. The tube 10 has an inlet end 11 and outlet end 12 which, of course, are interconnected with appropriate inlet apparatus and outlet apparatus to control the flow rate and required pressure in the tube 10. The configuration, etc., of the inlet apparatus and outlet apparatus will be determined by the reaction process and therefore form no part of this invention. A plurality of injection ports 20, 21, 22 are provided at spaced intervals along the length of the tube 10. For purposes of this disclosure, three ports are illustrated which are located at equally spaced intervals. It will be understood, however, that the number, size, configuration and location of the injection ports may vary depending on the size of the tube 10, the flow rate, the reactants and other variables unique to each reactor and reaction process. For purposes of illustration, three such ports are shown.

In accordance with the invention, a reaction stream comprising water and at least two reactants is caused to flow through a reaction tube 10 as illustrated by the arrow in the drawing. One of the reactants is an oxidant and one of the reactants is material to be oxidized. However, the proportions of reactants in the input stream are not stoichiometric. In the illustration described, a fluid stream containing an oxidizable material is injected into the tube 10 at the inlet 11 along with a selected oxidant. The oxidant may be air, oxygen, peroxide or any other desired oxidizing material. However, the amount of oxidant injected at the inlet 11 of the tube 10 is substantially less than the stoichiometric amount which would be required to fully oxidize the oxidizable material in the fluid stream.

To obtain reaction conditions near supercritical, the pressure in the reactor tube should be greater than about 218 bar. Accordingly, as the fluid stream moves from the inlet 11 toward first port 20, oxidation of the oxidizable material releases energy in the form of heat which causes the temperature of the fluid stream to rise. As the temperature rises, the rate of reaction increases and further raises the temperature.

Port 20 is positioned and adapted to inject water into the tube at approximately the point where the process stream reaches a pre-determined maximum permitted temperature. Water injected at port 20 absorbs some of the heat energy and causes the temperature of the stream to drop dramatically as illustrated in the idealized graph. In the preferred embodiment, an oxidant is injected simultaneously with the water. By injection of sufficient oxidant with the water, the reaction is first quenched and then re-started. The temperature of the process stream again increases as the stream moves toward port 21. At port 21 water and oxidant are again injected, again reducing the temperature and re-starting the reaction. The quench and re-start sequence is repeated at port 22, etc., until the oxidizable material is substantially completely oxidized.

It will be recognized that as the concentration of oxidizable material is reduced, the rate of temperature increase after each quench will be reduced. Because of heat loss from the system by radiation and/or conduction from the tube 10, the shape of the temperature versus distance curve in any system will vary somewhat from that shown in the idealized graph. Furthermore, while the drawing illustrates the temperature drop as a somewhat linear step function, the shape of the curve will be essentially controlled by the rate and degree of mixing of the cold water with the fluid stream. However, depending on the reactants employed, the sequential injection of water and an oxidant can be controlled as desired to limit the maximum temperature.

Where the concentration of oxidizable material in the reaction stream is too low to maintain the desired reaction temperature in a flowing system, the arrangement discussed above may be altered. For example, the input stream may comprise water containing a toxic or otherwise undesirable material which, although oxidizable, is in such low concentrations that the heat generated by oxidation would be insufficient to raise the temperature of the process stream to the operating temperature required. In this case excess oxidant may be added to the water stream containing the oxidizable material. The process stream containing water, the material to be oxidized and excess oxidant is then injected into the reaction chamber 10 and oxidizable material and water injected at the injection ports.

Oxidizable material may be injected into the process stream at the inlet or at the first port 20 to raise the temperature of the process stream to the desired reaction temperature. Since the process stream carries excess oxidant, oxidizable material injected into the process stream at the first port 20 should be less than the stoichiometric amount required to neutralize all the oxidant but sufficient to raise the temperature of the process stream to the maximum permitted temperature by the time the process stream reaches the second port 21. Water and oxidizable material are injected at port 21 in amounts sufficient to reduce the temperature and re-start the reaction and the sequence repeated with oxidation occurring between each injection until the desired reaction conditions have been achieved.

Injection of oxidizable material into a process stream containing excess oxidant may be advantageous under certain circumstances. As noted above, where the concentration of material to be oxidized is not sufficient to maintain the desired reaction temperature, excess oxidant may be included in the process stream and oxidizable fuel injected with water to control the reaction temperature. The oxidizable material injected need not be the same material as the oxidizable material contained in the initial stream. Instead, the injected oxidizable material may be, for example, a different waste material containing a high concentration of hydrocarbons or the like. Furthermore, it may be more efficient to heat the process stream by injecting an oxidizable fuel into a process stream containing excess oxidant than to externally heat the process stream to initiate the reaction. Thus, rather than using external energy for heating a reaction tube to initiate and maintain the desired reaction temperature, oxidizable material in the form of a hydrocarbon fuel or another waste stream containing excess oxidizable material may be injected into the reaction tube to initiate and/or maintain the reaction. Where the additional oxidizable material is another waste stream, the water in which the oxidizable material is contained may, of course, act as all or part of the quench water.

The injection of oxidizing fuel into a stream containing excess oxidant is sometimes necessary to remove (or prevent formation of) undesired by-products in the reaction stream. For example, where the input stream contains amines or the like, ammonia and related nitrogenous materials may be produced by the oxidation process. In order to effectively remove undesirable nitrogenous by-products from the process stream, the inlet stream containing the oxidizable material may be diluted with water (unless initially so diluted) so that the inlet stream contains insufficient oxidizable material to raise the temperature of the reaction stream above the desired maximum temperature even if immediately and completely oxidized. In other words, the inlet stream, if fully oxidized, cannot produce sufficient energy to raise the temperature of the process above the maximum permitted temperature. However, the inlet stream contains excess oxidant. By injecting fuel (in the form of another waste stream or a hydrocarbon fuel) at the injection ports, the temperature of the reaction stream may be increased as desired. Under certain conditions, it may be unnecessary to quench the system. Instead, the temperature may naturally decay after each fuel injection and additional fuel injections be required (without quenching) to maintain the desired temperature.

It will be readily recognized that the amount of material injected at each port and the spacing between ports will be determined by flow rate through the reactor, concentration of reactants, etc. However, by appropriately controlling the injection of water and reactant, with knowledge of the reaction conditions occurring, the temperature within the reaction tube 10 can be accurately controlled within predetermined upper and lower temperature limits. Thus, the process stream flowing through the tube may be maintained at temperatures between an upper limit and a lower limit as the reaction stream flows through the plug flow reactor. The appropriate reaction conditions can therefore be maintained until complete oxidation of all the oxidizable material in the reaction stream has been obtained.

The amount of water and reactant to be injected at each port can be pre-determined when the concentration of reactants in the input process stream is known and constant. Where the flow rate and/or concentrations of reactants in the input stream are subject to changes, the amount of water and reactant to be injected at each port can be varied as required by determining the temperature of the process stream upstream from the input port using suitable temperature sensors such as thermocouples or the like.

As described above, the process of the invention can be used to control reactants and maintain reaction temperatures within desired limits for a wide variety of reactions occurring at or near supercritical water conditions. The temperature parameters, of course, may be varied as required for the particular reactions required.

Although the invention has been described with particular reference to specific embodiments thereof, the forms of the invention shown and described in detail are to be taken as preferred embodiments of same. It is to be understood, therefore, that various changes and modifications may be resorted to without departing from the spirit and scope of the invention as defined by the appended claims.

What is claimed:

1. A method of controlling reactions in a process stream in which an exothermic reaction of at least two reactants occurs comprising:

(a) causing a process stream containing water and a first reactant to flow from an inlet toward an outlet in an elongated reaction chamber under a pressure greater than 218 bar and a temperature sufficient to achieve at least supercritical water conditions;

(b) sensing a temperature of the process stream;

(c) injecting a sufficient amount of water into said elongated reaction chamber a first location downstream from said inlet to reduce the temperature of the process stream downstream from said inlet, wherein the water is injected into the reaction chamber as a function of the sensed temperature; and (d) injecting a second reactant into said reaction chamber.

2. A method as set forth in claim 1 wherein said second reactant is injected into said reaction chamber at said first location substantially simultaneously with said amount of water.

3. A method as set forth in claim 1 further including injecting water into said elongated reaction chamber at a second location which is downstream from said first location.

4. A method as set forth in claim 3 further including injecting a reactant into said reaction chamber at a location which is downstream from said first location.

5. A method as set forth in claim 3 further including injecting the second reactant into said reaction chamber at a location which is downstream from said first location.

6. A method as set forth in claim 1 wherein said process stream containing the water and the first reactant also contains a reactant in a proportion which is less than that necessary to cause complete reaction of one of said reactants.

7. The method of claim 1 wherein the process stream contains oxidizable material and an excess of oxidant flowing from the inlet toward the outlet in the elongated reaction chamber.

8. The method of claim 1 wherein the process stream contains oxidant and an excess of oxidizable material flowing from the inlet toward the outlet in the elongated reaction chamber.

9. A method as set forth in claim 1 wherein said reaction chamber containing the water and the first reactant also contains the second reactant in a proportion which is less than that necessary to cause complete reaction of one of said reactants.

10. A method of limiting a maximum temperature of a process stream containing oxidizable material flowing from an inlet toward an outlet in an elongated reaction chamber under a pressure greater than 218 bar and a temperature sufficient to achieve at least supercritical water conditions comprising:

(a) sensing a temperature of the process stream with a temperature sensor;

(b) injecting water into said reaction chamber at a first location downstream from said inlet, wherein the water is injected into the reaction chamber as a function of the temperature sensed by the temperature sensor; and (c) injecting oxidant into said reaction chamber at a location downstream from said inlet.

11. A method as set forth in claim 10 wherein said oxidant is injected into said reaction chamber at said first location.

12. A method as set forth in claim 10 wherein said oxidant is injected into said reaction chamber substantially simultaneously with said water at the first location.

13. A method as set forth in claim 10, further including:

(c) injecting water into said reaction chamber at a second location downstream from said first location; and (d) injecting a second oxidant into said reaction chamber at a location downstream from said first location.

14. A method of limiting a maximum temperature of a process stream containing oxidant material flowing from an inlet toward an outlet in an elongated reaction chamber under a pressure greater than 218 bar and a temperature sufficient to achieve at least supercritical water conditions comprising:

(a) sensing a temperature of the process stream with a temperature sensor;

(b) injecting water into said reaction chamber at a first location downstream from said inlet, wherein the water is injected into the reaction chamber as a function of the temperature sensed by the temperature sensor; and (c) injecting oxidizable material into said reaction chamber at a location downstream from said inlet.

15. A method as set forth in claim 14 wherein said oxidizable material is injected into said reaction chamber at said first location.

16. A method as set forth in claim 14 wherein said oxidizable material is injected into said reaction chamber substantially simultaneously with said water at the first location.

17. A method as set forth in claim 14 further including:

(c) injecting water into said reaction chamber at a second location downstream from said first location; and (d) injecting oxidizable material into said reaction chamber at a location downstream from said first location.

18. A method of limiting a maximum temperature of a process stream containing oxidant flowing from an inlet toward an outlet in an elongated reaction chamber under a pressure greater than 218 bar and a temperature sufficient to achieve at least supercritical water conditions comprising:

(a) sensing a temperature of the process stream with a temperature sensor;

(b) injecting a sufficient amount of water into said reaction chamber at a first location downstream from said inlet to reduce the temperature of the process stream, wherein the water is injected into the reaction chamber as a function of the temperature sensed by the temperature sensor; and (c) injecting oxidizable material into said reaction chamber at a location downstream from said inlet.

19. A method as set forth in claim 18 wherein said oxidizable material is injected into said reaction chamber at said first location.

20. A method as set forth in claim 18 wherein said oxidizable material is injected into said reaction chamber substantially simultaneously with said amount of water at the first location.

21. A method as set forth in claim 18 further including:

(c) injecting water into said reaction chamber at a second location downstream from said first location; and (d) injecting additional oxidizable material into said reaction chamber at a location downstream from said first location.

22. A method as set forth in claim 18 wherein said process stream containing the oxidant also contains oxidizable material in a proportion which is less than stoichiometric proportion with respect to the proportion of the oxidant contained in said stream.

23. A method as set forth in claim 18 wherein the oxidizable material injected into said chamber at a location downstream from said inlet is not the same oxidizable material as that contained in said process stream.

24. A method of controlling the reaction rate of an exothermic reaction in a plug flow reactor comprising:

(a) injecting a process stream comprising water, an oxidant and oxidizable material in insufficient concentrations to completely oxidize said oxidizable material into an inlet of an elongated reaction chamber under a pressure greater than 218 bar an a sufficient temperature to achieve at least supercritical water conditions;

(b) sensing a temperature of the process stream with a temperature sensor;

(c) injecting water into said elongated reaction chamber downstream from said inlet in an amount sufficient to lower the temperature of the process stream, wherein the water is injected into the reaction chamber as a function of the temperature sensed by the temperature sensor; and (d) injecting oxidant into said elongated reaction chamber downstream from said inlet.

25. A method of controlling the reaction rate of an exothermic reaction in a plug flow reactor comprising:

(a) injecting a process stream comprising water, an oxidant and oxidizable material in insufficient concentrations to react with all of said oxidant into an inlet of an elongated reaction chamber under a pressure greater than 218 bar and at a sufficient temperature to achieve at least supercritical water conditions;

(b) sensing a temperature of the process stream with a temperature sensor;

(c) injecting water into said elongated reaction chamber downstream from said inlet in an amount sufficient to lower the temperature of the process stream, wherein the water is injected into the reaction chamber as a function of the temperature sensed by the temperature sensor; and (d) injecting oxidizable material into said elongated reaction chamber downstream from said inlet.

26. A method of controlling a reaction in a process stream in which an exothermic reaction of at least two reactants occurs, comprising:

(a) introducing a process stream containing water and a first reactant into a reactor with a an inlet and an outlet, wherein the reactor is configured to contain the process stream as it flows in the reactor from the reactor inlet to the reactor outlet;

(b) sensing a temperature of the process stream with a temperature sensor;

(c) flowing the process stream in the reactor at a pressure of at least 218 bar and a temperature sufficient to achieve supercritical water conditions;

(d) injecting water into the reactor at a first location downstream from the inlet, wherein the water is injected into the reactor as a function of the temperature sensed by the temperature sensor; and (e) injecting a second reactant into the reactor.

27. The method of claim 26 wherein the reactor is substantially elongated.

28. The method of claim 26 wherein sufficient water is injected into the reactor at the first location such that the temperature of the process stream is reduced at or downstream from the first location.

29. The method of claim 26 wherein the second reactant is injected into the reactor at the first location substantially simultaneously with the water.

30. The method of claim 26, further including injecting water into the reactor at a second location which is downstream from the first location.

31. The method of claim 26, further including injecting water into the reactor at a second location which is downstream from the first location, and further including injecting a reactant into the reactor at a location which is downstream from the first location.

32. The method of claim 26 wherein the process stream containing the water and the first reactant also contains a reactant in a proportion which is less than that necessary to cause complete reaction of one of the reactants.

33. The method of claim 26 wherein the second reactant comprises an oxidant.

34. The method of claim 26 wherein the second reactant comprises oxidizable matter.

35. The method of claim 26 wherein the first reactant comprises oxidizable matter and the second reactant comprises an oxidant.

36. The method of claim 26 wherein the first reactant comprises oxidizable matter and the second reactant comprises an oxidant, and further including injecting water into the reactor at a second location which is downstream from the first location, and further including injecting an oxidant into the reactor at a location which is downstream from the first location.

37. The method of claim 26 wherein the first reactant comprises oxidizable matter and the second reactant comprises an oxidant, and wherein the water and the second oxidant are substantially simultaneously injected into the reactor at the first location, and further including injecting water into the reactor at a second location which is downstream from the first location, and further including injecting a third oxidant into the reactor at a location which is downstream from the first location.

38. The method of claim 26 wherein the reactor is a plug flow reactor.

39. The method of claim 26 wherein the water at the second location is injected into the reactor at timed intervals.

40. The method of claim 26 wherein at least one reactant is injected into the reactor at timed intervals.

41. The method of claim 26 wherein the water at the second location and at least one reactant are injected into the reactor at timed intervals.

42. The method of claim 26, further comprising controlling the temperature of the process stream between pre-determined upper and lower limits.

43. The method of claim 26, further comprising controlling the temperature of the process stream between pre-determined upper and lower limits, the controlling being achieved by injecting the water at the first location into the reactor to reduce the temperature of the process stream and by injecting a reactant into the reactor to increase the temperature of the process stream.

44. The method of claim 26 wherein the first reactant comprises oxidizable matter and the second reactant comprises an oxidant, and further comprising (a) injecting water into the reactor at a second location which is downstream from the first location, (b) injecting an oxidant into the reactor at a location which is downstream from the first location, and (c) controlling the temperature of the process stream between pre-determined upper and lower limits.

45. The method of claim 26, further comprising controlling the maximum temperature of the process stream by controlling the injection of the water at the first location and the reactor, the water being injected to absorb at least a portion of the heat energy caused by the reaction of the reactant in the process stream.

46. The method of claim 26 wherein the first reactant is oxidizable matter and the second reactant is an oxidant, and wherein the second oxidant is added in an insufficient concentration to fully react all of the oxidizable matter in the process stream.

47. The method of claim 26 wherein the first reactant is oxidizable matter and the second reactant is an oxidant, and wherein the second oxidant is added in an insufficient concentration to fully react all of the oxidizable matter in the process stream, and further comprising injecting sufficient additional oxidant into the process stream to substantially completely oxidize the oxidizable matter.

48. The method of claim 26 wherein the first reactant is oxidizable matter and the second reactant is an oxidant, and wherein the second oxidant is added in an insufficient concentration to fully react all of the oxidizable matter in the process stream, and further comprising injecting sufficient additional oxidant into the process stream to substantially completely oxidize the oxidizable matter, and further comprising injecting sufficient additional water into the process stream to control the temperature of the process stream under a pre-determined upper limit by absorbing at least a portion of the heat energy caused by reaction of the additional oxidant in the process stream.

49. The method of claim 26 wherein the process stream contains oxidizable material and an excess of oxidant flowing from an inlet toward an outlet in an elongated reaction chamber.

50. The method of claim 26 wherein the process stream contains oxidant and an excess of oxidizable material flowing from an inlet toward an outlet in an elongated reaction chamber.

51. A system for controlling a reaction in a process stream in which an exothermic reaction of at least two reactants occurs, comprising:
(a) a process stream conduit connected to convey a process stream containing water and a first reactant into an inlet of a reactor, the reactor being configured to contain the process stream as it flows in the reactor from the reactor inlet to a reactor outlet, and the reactor being constructed to contain a process stream in the reactor at a pressure of at least 218 bar and a temperature sufficient to achieve supercritical water conditions;
(b) an water injection conduit connected to convey water from a water source to the reactor at a first location downstream from the inlet;
(c) a second reactant injection conduit connected to convey a second reactant from a second reactant source to the reactor;
(d) a temperature sensor in the reactor downstream from the inlet; and
(e) a control system adapted to vary the amount of water into the reactor as a function of temperature sensed by the temperature sensor.

52. The system of claim 51 wherein the reactor is substantially elongated.

53. The system of claim 51 further comprising a control system adapted to vary the amount of second reactant into the reactor as a function of temperature sensed by the temperature sensor.

54. The system of claim 51 wherein the second reactant injection conduit is connected to convey the second reactant into the reactor at the first location substantially simultaneously with the water conveyed into the reactor by the water injection conduit.

55. The system of claim 51, further including an additional water injection conduit connected to convey water into the reactor at a second location which is downstream from the first location.

56. The system of claim 51, further including an additional water injection conduit connected to convey water into the reactor at a second location which is downstream from the first location, and further comprising a reactant injection conduit connected to convey a reactant into the reactor at a location which is downstream from the first location.

57. The system of claim 51 wherein the second reactant comprises an oxidant.

58. The system of claim 51 wherein the second reactant injection conduit is connected to convey the second reactant to the reactor at a location downstream of the inlet, and wherein the second reactant comprises oxidizable matter.

59. The system of claim 51 wherein the first reactant comprises oxidizable matter and the second reactant comprises an oxidant.

60. The system of claim 51 wherein the reactor is a plug flow reactor.

61. The system of claim 51, further comprising a system adapted to inject the water at the first location into the reactor at timed intervals.

62. The system of claim 51, further comprising a system adapted to inject at least one reactant into the reactor at timed intervals.

63. The system of claim 51, further comprising a system adapted to inject the water at the first location and at least one reactant into the reactor at timed intervals.

64. The system of claim 51 wherein the control system is adapted to control the temperature of the process stream between pre-determined upper and lower limits.

65. The system of claim 51 further comprising a control system adapted to vary the amount of second reactant into the reactor as a function of temperature sensed by the temperature sensor, wherein the control system for the second reactant is adapted to control the temperature of the process stream between pre-determined upper and lower limits.

66. A system for controlling a reaction in a process stream in which an exothermic reaction of at least two reactants occurs, comprising:
(a) a process stream conduit connected to convey a process stream containing water and a first reactant into an inlet of a reactor, the reactor being configured to contain the process stream as it flows in the reactor from the reactor inlet to a reactor outlet, and the reactor being constructed to contain a process stream in the reactor at a pressure of at least 218 bar and a temperature sufficient to achieve supercritical water conditions;
(b) a water injection conduit connected to convey water from a water source to the reactor at a first location downstream from the inlet;
(c) a second reactant injection conduit connected to convey a second reactant from a second reactant source to the reactor;
(d) a temperature sensor in the reactor downstream from the inlet; and
(e) a control system adapted to vary the amount of second reactant into the reactor as a function of temperature sensed by the temperature sensor.

67. The system of claim 66 wherein the reactor is substantially elongated.

68. The system of claim 66 wherein the second reactant injection conduit is connected to convey the second reactant into the reactor at the first location substantially simultaneously with the water conveyed into the reactor by the water injection conduit.

69. The system of claim 66, further including an additional water injection conduit connected to convey water into the reactor at a second location which is downstream from the first location.

70. The system of claim 66, further including an additional water injection conduit connected to convey water into the reactor at a second location which is downstream from the first location, and further comprising a reactant injection conduit connected to convey a reactant into the reactor at a location which is downstream from the first location.

71. The system of claim 66 wherein the second reactant comprises an oxidant.

72. The system of claim 66 wherein the second reactant injection conduit is connected to convey the second reactant to the reactor at a location downstream of the inlet, and wherein the second reactant comprises oxidizable matter.

73. The system of claim 66 wherein the first reactant comprises oxidizable matter and the second reactant comprises an oxidant.

74. The system of claim 66 wherein the reactor is a plug flow reactor.

75. The system of claim 66, further comprising a system adapted to inject the water at the first location into the reactor at timed intervals.

76. The system of claim 66, further comprising a system adapted to inject at least one reactant into the reactor at timed intervals.

77. The system of claim 66, further comprising a system adapted to inject the water at the first location and at least one reactant are injected into the reactor at timed intervals.

78. The system of claim 66 wherein the control system is adapted to control the temperature of the process stream between pre-determined upper and lower limits.

79. A method of controlling a reaction in a process stream in which an exothermic reaction of at least two reactants occurs, comprising:
(a) introducing a process stream containing water and a first reactant into a reactor with a an inlet and an outlet, wherein the reactor is configured to contain the process stream as it flows in the reactor from the reactor inlet to the reactor outlet;
(b) flowing the process stream in the reactor at a pressure of at least 218 bar and a temperature sufficient to achieve supercritical water conditions;
(b) injecting, water into the reactor at a first location downstream from the inlet; and
(c) sensing a temperature of the process stream; and
(d) injecting a second reactant into the reactor as a function of the sensed temperature.

80. The method of claim 79 wherein the reactor is substantially elongated.

81. The method of claim 79 wherein sufficient water is injected into the reactor at the first location such that the temperature of the process stream is reduced at or downstream from the first location.

82. The method of claim 79 wherein the second reactant is injected into the reactor at the first location substantially simultaneously with the water.

83. The method of claim 79, further including injecting water into the reactor at a second location which is downstream from the first location.

84. The method of claim 79, further including injecting water into the reactor at a second location which is downstream from the first location, and further including injecting a reactant into the reactor at a location which is downstream from the first location.

85. The method of claim 79 wherein the process stream containing the water and the first reactant also contains a reactant in a proportion which is less than that necessary to cause complete reaction of one of the reactants.

86. The method of claim 79 wherein the second reactant comprises an oxidant.

87. The method of claim 79 wherein the second reactant comprises oxidizable matter.

88. The method of claim 79 wherein the first reactant comprises oxidizable matter and the second reactant comprises an oxidant.

89. The method of claim 79 wherein the first reactant comprises oxidizable matter and the second reactant comprises an oxidant, and further including injecting water into the reactor at a second location which is downstream from the first location, and further including injecting an oxidant into the reactor at a location which is downstream from the first location.

90. The method of claim 79 wherein the first reactant comprises oxidizable matter and the second reactant comprises an oxidant, and wherein the water and the second oxidant are substantially simultaneously injected into the reactor at the first location, and further including injecting water into the reactor at a second location which is downstream from the first location, and further including injecting a third oxidant into the reactor at a location which is downstream from the first location.

91. The method of claim 79 wherein the reactor is a plug flow reactor.

92. The method of claim 79 wherein the water at the second location is injected into the reactor at timed intervals.

93. The method of claim 79 wherein at least one reactant is injected into the reactor at timed intervals.

94. The method of claim 79 wherein the water at the second location and at least one reactant are injected into the reactor at timed intervals.

95. The method of claim 79, further comprising controlling the temperature of the process stream between pre-determined upper and lower limits.

96. The method of claim 79, further comprising controlling the temperature of the process stream between pre-determined upper and lower limits, the controlling being achieved by injecting the water at the first location into the reactor to reduce the temperature of the process stream and by injecting a reactant into the reactor to increase the temperature of the process stream.

97. The method of claim 79 wherein the first reactant comprises oxidizable matter and the second reactant comprises an oxidant, and further comprising (a) injecting water into the reactor at a second location which is downstream from the first location, (b) injecting an oxidant into the reactor at a location which is downstream from the first location, and (c) controlling the temperature of the process stream between pre-determined upper and lower limits.

98. The method of claim 79, further comprising controlling the maximum temperature of the process stream by controlling the injection of the water at the first location into the reactor, the water being injected to absorb at least a portion of the heat energy caused by the reaction of the reactant in the process stream.

99. The method of claim 79 wherein the first reactant is oxidizable matter and the second reactant is an oxidant, and wherein the second oxidant is added in an insufficient concentration to fully react all of the oxidizable matter in the process stream.

100. The method of claim 79 wherein the first reactant is oxidizable matter and the second reactant is an oxidant, and wherein the second oxidant is added in an insufficient concentration to fully react all of the oxidizable matter in the process stream, and further comprising injecting sufficient additional oxidant into the process stream to substantially completely oxidize the oxidizable matter.

101. The method of claim 79 wherein the first reactant is oxidizable matter and the second reactant is an oxidant, and wherein the second oxidant is added in an insufficient concentration to fully react all of the oxidizable matter in the process stream, and further comprising injecting sufficient additional oxidant into the process stream to substantially completely oxidize the oxidizable matter, and further comprising injecting sufficient additional water into the process stream to control the temperature of the process stream under a pre-determined upper limit by absorbing at least a portion of the heat energy caused by reaction of the additional oxidant in the process stream.

102. The method of claim 79 wherein the process stream contains oxidizable material and an excess of oxidant flowing from an inlet toward an outlet in an elongated reaction chamber.

103. The method of claim 79 wherein the process stream contains oxidant and an excess of oxidizable material flowing from an inlet toward an outlet in an elongated reaction chamber.

* * * * *